United States Patent

[11] 3,615,871

[72] Inventors Veit Merges
Munich;
Paul Zahn, Ottobrunn, both of Germany
[21] Appl. No. 696,642
[22] Filed Jan. 9, 1968
[45] Patented Oct. 26, 1971
[73] Assignee Bolkow Gesellschaft mit beschrankter Haftung
Ottobrunn bei Munich, Germany
[32] Priority Jan. 12, 1967
[33] Germany
[31] B90707

[54] THERMOELECTRIC DEVICE

11 Claims, 2 Drawing Figs.

[52] U.S. Cl. .......... 136/205, 136/212
[51] Int. Cl. .......... H01v 1/32
[50] Field of Search .......... 136/202, 230, 208–212, 224, 204, 205, 203

[56] References Cited
UNITED STATES PATENTS

| | | | |
|---|---|---|---|
| 1,526,641 | 2/1925 | Mulvany et al. | 136/230 X |
| 3,296,033 | 1/1967 | Scuro et al. | 136/205 |
| 3,351,498 | 11/1967 | Shinn et al. | 136/205 |
| 3,362,853 | 1/1968 | Valdsaar | 136/205 |
| 3,391,030 | 7/1968 | Beaver, Jr. et al. | 136/205 X |
| 3,452,423 | 7/1969 | Webb | 136/205 X |

*Primary Examiner*—Carl D. Quarforth
*Assistant Examiner*—Harvey E. Behrend
*Attorney*—McGlew and Toren

ABSTRACT: A thermoelectric device including a semiconductor thermocouple element having *p* and *n*-conductive legs. Each of the thermoconductive legs consists of at least two thermally and electrically series connected parts of different material. The electric and thermal connection between the parts of the legs comprises bodies of good thermoconductivity, preferably silver threads twisted to multistranded cable pieces, which are arranged in a slackened condition.

PATENTED OCT 26 1971 3,615,871

SHEET 1 OF 2

INVENTORS
Paul Zahn
Veit Merges

By Mathlaw and Toren [signature]
ATTORNEYS

INVENTORS
Paul Zahn
Veit Merges
By
[signature] and [signature]
ATTORNEYS

THERMOELECTRIC DEVICE

SUMMARY OF THE INVENTION

This invention relates in general to the construction of thermoelectric devices, and in particular to a new and useful thermoelectric device for transforming thermal energy into electric energy by means of thermocouple elements which are arranged adjacent a heat-emitting core and wherein each of the *p* and *n* conductive legs of the thermocouple elements comprise a plurality of parts which are joined together by slack connecting elements of good thermoconductivity.

The efficiency of the energy transformation in thermoelectric devices by means of thermocouple elements depends not only on the efficiency of each thermocouple element but is determined substantially by the attainable temperature differences between the hot and the cold ends of the the thermocouple elements. In order to obtain an optimum thermoelectric utilization of a high temperature difference, segmented thermocouple elements of semiconductive materials have been suggested which include *p* and *n* conductive legs having segments of material of different thermoelectrical activity. Such legs must be joined together with each other so that they are thermally and electrically conductive. Each of these segments therefore can work optimally in specific temperature range. In this manner, temperature gradients of about 1000° C. can be utilized in the most efficient manner for thermoelectric generators.

The construction of such segmented thermocouple elements is difficult inasmuch as the individual semiconductive segments must be connected with each other thermally and electrically in such a way that despite the high temperature gradient both the segments themselves and their connections can follow the heat expansions and contractions which occur during use. Such expansions and contractions are caused by the different expansion coefficients and temperature potentials of the different materials making up the thermoelectric device, and it is most desirable that the elements of the thermocouples be capable of accommodating such expansions and contractions destroying the thermocouple elements and without reducing the heat flow since this heat flow determines the power of the thermoelectric generator. The industrial use of these thermocouple elements was prevented up to the present time because of the lack of satisfactory control of the thermostresses at the junctions of the individual segments and their mountings.

In accordance with the present invention, a thermoelectric device includes segmented thermocouple elements comprising a thermoelectric generator wherein each of the *p* and *n* leg portions are divided in a plurality of segments each of which are electrically and thermally connected together in a manner permitting their relative movement during temperature changes and without causing any damage to their parts or their mountings. Each *p* and *n* conductive leg consists of at least two electrically joined parts of materials with different thermoelectric activity. The parts are joined together by elements which are arranged in a bending-slack condition and which have good thermoconductivity. For this purpose, silver threads which are twisted to multistranded cable pieces have proved to be very satisfactory. Thus, the individual segments can move to accommodate their own thermal stresses and those of their mountings without impairing good heat contact between the hot ends of the thermocouple elements and the heat-emitting core or the contact between the individual segments. Another advantage resides in the fact that due to the elastic interconnection of the individual segments the cold end of the thermocouple elements can be connected rigidly to a radiator structure. The elastic interconnection of the individual segments of the thermocouple leg elements permits a particularly simple construction of the mounting for such elements. All of the segmented thermocouple leg elements are held by a two-part sleeve of heat insulating material having an outer surface which encloses a truncated cone which is supported in a truncated recess in a structure of the thermoelectric generator. In this manner a compact construction with easily exchangeable elements is achieved. In addition, the safe support of the multipart thermocouple elements and the simple assembly of the elements in the structure of a thermoelectric generator having a plurality of such thermoelectric devices is attainable.

Accordingly, it is an object of the invention to provide a thermoelectric device having a semiconductive thermocouple element with *p* and *n* conductive legs each of which comprise at least two thermally and electrically series connected parts of different materials which are connected together by thermally conductive elements arranged in a slack condition.

A further object of the invention is to provide a construction of a thermoelectric generator wherein all of the parts of a thermocouple element are held in a sleeve of heat insulating material which is positioned within a truncated cone recess of a heat insulation material of a thermoelectric generator in a manner such that one end can be positioned adjacent a heat-emitting core which may be either radioactively heated or conventionally heated.

A further object of the invention is to provide a thermoelectric device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
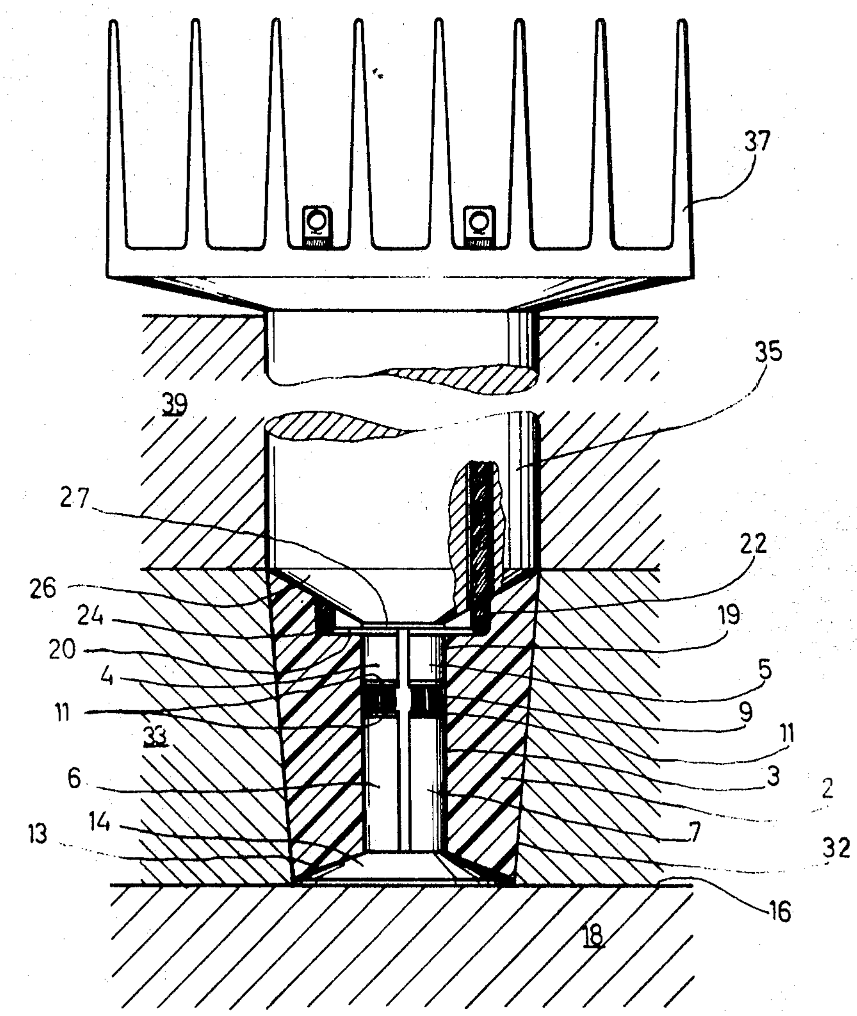
FIG. 1 is a partial elevational and partial axial sectional view of a thermoelectric device constructed in accordance with the invention.

Referring to the drawing FIG. 1 in particular, the invention embodied therein comprises a two-part sleeve or thermocouple holder generally designated 2 of a heat insulation material which includes a bore which receives a thermocouple element generally designated 3. The thermocouple element 3 includes a *p*-conductive leg having two segments 4 and 6 of materials of different thermoelectric activity. In addition, it includes an *n*-conductive leg which comprises two segments 5 and 7 of materials of different thermoelectric activity.

In accordance with the invention, the segments 4, 6, and 5, 7 of each leg are joined together thermally and electrically by slack bodies in the form of loosely fitting or bending-slack bodies or strands 9 which are held between plates 11, 11 soldered to the respective segments. The bodies 9 advantageously are arranged in a slackened condition and comprise silver threads twisted to multistranded cable pieces.

The thermocouple element 3 bears with its hot end against a truncated bridge 14 having its opposite end arranged on an electric insulating layer 16 which covers a heat-emitting core 18. The core 18 is heated in the FIG. 1 embodiment by means of a radioactive heat source (not shown).

The cold end 19 of the thermocouple element 3 contacts stud members or studs 20. The studs 20 carry electrical terminals 22 and 24. An insulating layer 27 insulates studs 20 in the range of the thermocouple element from a heat conducting piece 26 of truncated conical configuration. The truncated heat-conducting piece is connected with or formed integrally as a portion of a cylindrical portion or body 35. The cylindrical portion and the truncated piece fit into a radioactive ray shielding plate 39 and a recess of the sleeve 2. The sleeve 2, in turn, fits into a truncated recess 32 of a heat insulation layer 33 of the structure of the thermoelectric generator (not shown). The truncated heat conducting piece 26 with the cylindrical body 35 gives off heat from the cold end of the thermocouple elements to a radiator 37. The electrical terminals 22 and 24 traverse both the heat conductive piece and the cylindrical body 35 and terminate on the outside of the radiator or any other similar cooler (not shown). One half of the sleeve 2 holding the thermocouple elements and the heat conducting pieces form preferably a common structural part so that an easy assembly and simple exchangeability of the group of elements incorporated in the thermoelectric device is achieved.

Figure 2:
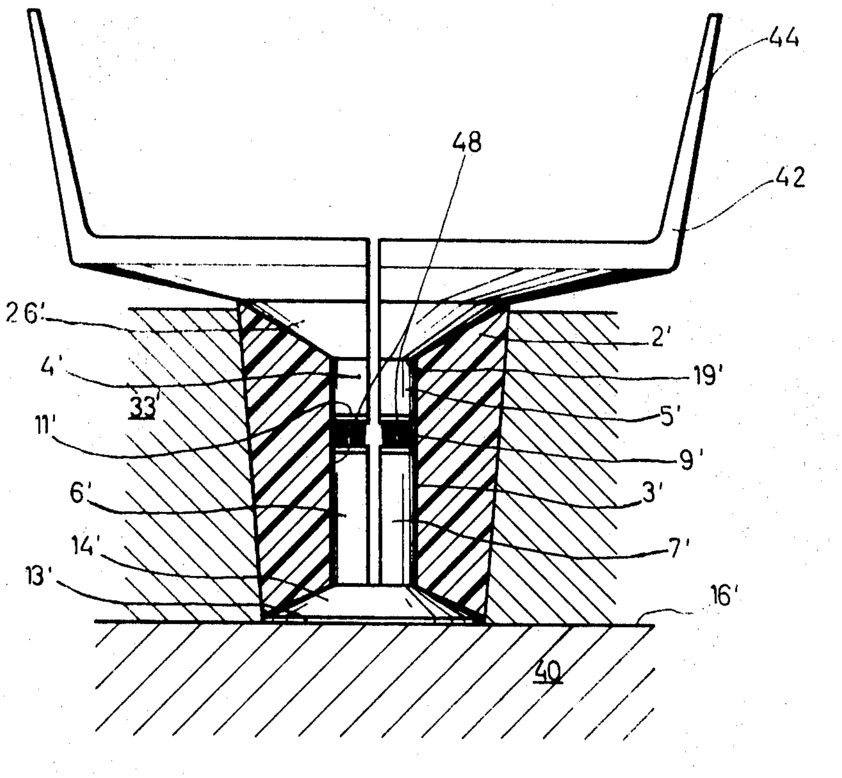
FIG. 2 is a view similar to FIG. 1 of another embodiment of the device.

In the embodiment illustrated in FIG. 2, similar parts are similarly designated but with addition of a prime. The thermoelectric generator includes a heat-emitting core 40 which is heated by a conventional heat source (not shown), for example a gas burner, so that special shielding against radioactivity is not required. Accordingly, the plate 39 is not required. Each thermocouple element 3' bears with its hot end 13' against the truncated bridge 14' which in turn is arranged on the insulating layer 16' which covers the heat-emitting core 40. The cold end 19' of each thermocouple element carries each radiator part 42 directly. The radiator 42 includes cooling fins 44 and it has the electrical potential of the respective thermocouple element. In addition, in the embodiment of Fig. 2 the slack bodies include springs 48 are arranged between the slack body strands 9'. The springs 48 may take the form, for example, of expansible elements such as metal bellows which are filled with a heat conducting liquid such as mercury.

While specific embodiments of the invention have been shown and described in detail to illustrate the application of the inventive principles, it will be understood that the invention may be embodied otherwise without departing from such principles.

What is claimed is:

1. A thermoelectric device comprising a semi-conductor thermocouple element having *p* and *n* conductive legs, each of said *p* and *n* conductive legs having at least two thermally electrically series connected parts of different materials, and a body of good thermal conductivity connected between said parts, means for spacing said parts a predetermined distance apart, said predetermined spacing being such that said body assumes a bending slack condition at least during operation when the parts are subjected to heating.

2. A thermoelectric device according to claim 1, wherein said body comprises silver threads twisted to multistranded cable pieces.

3. A thermoelectric device according to claim 1, additionally including a metal bellows connected between said parts, said bellows being filled with a heat conducting liquid.

4. A thermoelectric device according to claim 1, wherein said thermocouple element is surrounded by a sleeve of heat insulating material, and a thermal insulation layer of a thermoelectric generator having a recess into which said sleeve extends.

5. A thermoelectric device according to claim 4, wherein said sleeve is constructed of two parts, the recess of said heat insulation material being of a truncated cone configuration.

6. A thermoelectric device according to claim 1, wherein each of said thermocouple parts includes metal cross plates adjacent their respective connecting ends, said bodies being connected between cross plates of adjacent parts.

7. A thermoelectric device according to claim 1, including an accumulator spring disposed between the separate parts of each of said thermocouple legs.

8. A thermoelectric device comprising a truncated bridge adapted to be located adjacent a heat-emitting body a thermocouple in contacting relation with said bridge, said thermocouple comprising a plurality of leg portions, each of said leg portions comprising at least two parts which are separated, a thermally conductive material connected between the two parts of each of said leg portions, means for spacing said parts a predetermined distance apart, said predetermined spacing being such that said conductive material is slack at least when said parts are heated.

9. A device according to claim 8, wherein said sleeve is constructed of heat insulating materials, and a surrounding heat insulating layer having a recess into which said sleeve extends.

10. A thermoelectric device according to claim 9, including a radiation layer over said heat insulation layer, a heat conducting piece connected to the cold end of said thermocouples and extending through said radiation layer, and a radiator formed at the cold end of said conducting piece.

11. A device according to claim 11, including electrical terminals connected to the cold end of said thermocouple elements and extending through said heat conducting piece.

* * * * *